United States Patent [19]

Cope

[11] 3,931,993
[45] Jan. 13, 1976

[54] FORCE RESISTANT ASSEMBLY
[75] Inventor: Steven Andrew Cope, Wilmington, Del.
[73] Assignee: E. I. Du Pont de Nemours & Company, Wilmington, Del.
[22] Filed: May 31, 1974
[21] Appl. No.: 476,136

[52] U.S. Cl. .................. 285/200; 285/219; 285/423
[51] Int. Cl.² ............................................ F16L 5/00
[58] Field of Search ........... 285/355, 390, 200, 214, 285/423, 40; 151/7

[56] References Cited
UNITED STATES PATENTS

| | | |
|---|---|---|
| 2,540,900 | 2/1951 | McCool .......................... 285/390 X |
| 2,788,829 | 4/1957 | Edwards ................................ 151/7 |
| 3,013,820 | 12/1961 | Pouppirt ............................ 285/355 |
| 3,168,905 | 2/1965 | Wiltshire ........................ 285/219 X |
| 3,245,701 | 4/1966 | Leopold et al. ................. 285/355 X |
| 3,270,610 | 9/1966 | Knowlton ........................... 151/7 X |

FOREIGN PATENTS OR APPLICATIONS 1,091,385  10/1960  Germany ............................ 285/220

Primary Examiner—Dave W. Arola

[57] ABSTRACT

In a laminar polymeric sheet having a passageway which is threaded for part of the thickness of the sheet and a threaded element engaged with the threads in the passageway, the improvement wherein the thread engagement begins at a minimum distance from the top surface of the sheet.

4 Claims, 3 Drawing Figures

FORCE RESISTANT ASSEMBLY

BACKGROUND OF THE INVENTION

Sheet organic polymeric material is frequently used in place of metal in the preparation of vessels for gases and liquids under pressure. The strength of these sheet materials is increased by incorporating fibrous materials as layers of woven or nonwoven fabrics of organic or inorganic fibrous materials in the polymeric material. Threaded fittings are generally used to link these vessels to other operational equipment in a system. The fittings are normally attached from the low pressured side of the vessel wall.

Organic polymeric materials of such structures are usually thicker than metal when used in such applications. As a result, when conventional metal plugs and fluid conduits are threaded into passageways through such polymeric structures they frequently engage less than the full thicknesses of the structure. Forces on the plugs and conduits from fluid pressures often cause the polymeric materials to delaminate in the passageways on the pressure side of engaged threads, limiting the safe operating pressures. In addition, end plates of fiber-reinforced polymeric materials are often subject to surface delamination around threads accommodating pipe entries as a result of high tightening torques.

To accomodate high pressures in polymeric sheet structures, it has been proposed to use threaded inserts of metals in such structures as reinforcing plates which distribute fitting loads throughout the structure thickness. Such adaptations, however, are expensive and are more subject to corrosion than the structures they reinforce.

SUMMARY OF THE INVENTION

This invention provides a threaded polymeric sheet structure having increased resistance to delamination.

Specifically, the present invention provides, in the combination of (a) a sheet of organic polymeric material having a first and second side and reinforced with layered fibrous material aligned substantially parallel to the sides of the sheet, the sheet having a passageway formed therein, the walls of the passageway being integral with and of the same composition as the remainder of the sheet material and having female threads formed therein extending less than the thickness of the sheet, and (b) a male-threaded element secured in the passageway from the first side of the sheet by engagement of the male threads with the female threads in the passageway, the improvement wherein the engaged male and female threads nearest to the first side are a distance from the first side which is at least equal to 10 percent of the depth of engaged threads and not less than 2 millimeters.

BRIEF DESCRIPTION OF THE DRAWINGS

The FIGURES are cross-sectional views of sheet structures in conjunction with threaded elements according to the present invention.

DETAILED DESCRIPTION OF THE INVENTION

The present invention relates to laminar fiber-reinforced sheet polymeric organic structures having a threaded passageway therein for the reception of a threaded element such as a pipe or bolt. The invention is based on the discovery that the pressure applied to the threaded connection can be increased without delamination of the sheet by positioning the first fully engaged thread away from the side of the sheet into which the threaded element is inserted. This can be accomplished in various ways, as illustrated in the Figures.

Figure 1:
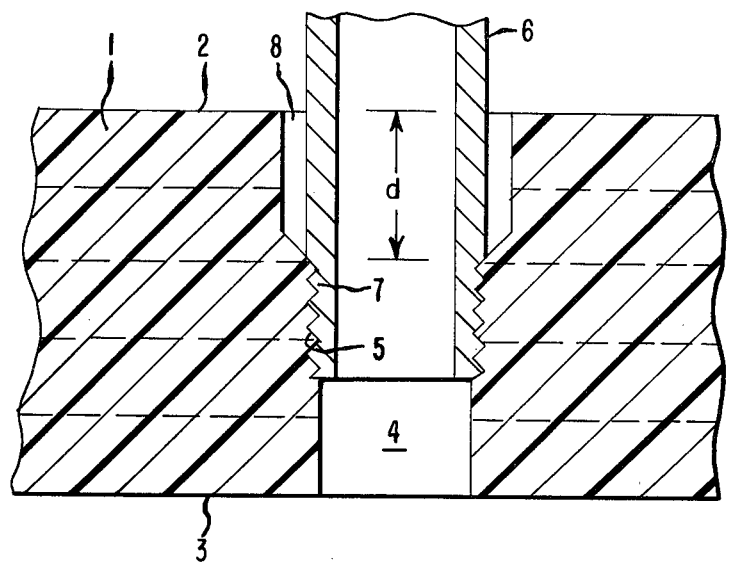

In FIG. 1, sheet 1 of laminar reinforced organic polymeric material has first surface 2 and second surface 3. The sheet is reinforced with woven or nonwoven fabric extending through it in layers generally parallel with surfaces 2 and 3. Typically the structure is made of hardened epoxy resin reinforced with woven glass fabric commercially identified as Laminate Grade G-10 by the standards of the National Electrical Manufacturers Association and disclosed in the 1973-74 Modern Plastics Encyclopedia on pages 174 to 180. Passageway 4 extends through sheet structure 1 between surfaces 2 and 3, and has female threads 5 formed in the walls of the passageway. Threaded element 6 is secured in passageway at the engagement of male threads 7 on element 6 with female threads 5.

Passageway 4 is expanded above the thread engagement to cylindrical recess 8. Recess 8 extends a distance d from surface 2 and has a radius greater than the threads 5, which clears element 6.

This sheet structure, when in combination with a threaded element as shown resists delamination from a fluid pressure applied through the passageway from side 3. Normally such a force would tend to delaminate the sheet structure at the point in the passageway at which the engaged female threads end. The readiness of delamination of the sheet structure by the fluid pressure is significantly reduced by the recess of a depth $d$ which is equal to at least 10 percent of the length of the engaged threads and not less than 2 millimeters.

As shown in the figure, the threaded element is a metal pipe, designed to be in stress against structure 1 as a result of fluid pressure applied against the sheet structure on surface 3. However, this threaded element can vary widely in its specific nature, as will be evident to those skilled in the art. For example, this element can also be a pipe fitting, such as an ell, tee, plug or valve for fluids, or a threaded rod supporting an opposing force on surface 2 of the sheet.

Figure 2:
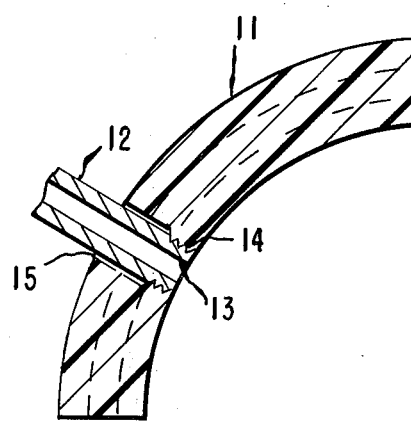

In FIG. 2, sheet structure 11 is a quarter segment through a cylindrical shell made by wrapping glass fibers helically as layers each having fibers which cross fibers of adjacent layers and setting an impregnating resin in and around the fibers. Pipe 12 has male threads 13 engaged in mating female threads 14 in structure 11. The engagement of threads 13 and 14 begins at the base of recess 15 which has a radius greater than threads 14 and just large enough to allow the insertion of pipe 12 through it.

The recess in the sheet structure is normally circular. It penetrates the structure against the direction of force tending to push out a threaded element engaged in the structure. The minimum radius of the recess is equal to or greater than the threads formed in the passageway, allowing a threaded element to be entered into the structure. A conical recess with its greatest diameter on the outer sheet surface and with its sides up to 60° from its axis provides sufficient strength. The recess radius at the structure surface should accordingly exceed the engaged thread diameter by no more than about 1.75 times the depth of the recess.

It is also convenient for the recess to be cylindrical for a part of its depth. Such a recess is usually conical at its base because boring tools normally lead with conically positioned cutting edges. Cylindrical recesses usually have maximum radii which exceed engaged thread radii by up to 0.7 times the recess depths. In cases where the threaded elements are pipes, conical or cylindrical recesses whose surface radii exceed thread radii by up to 0.2 times the recess depths aid in guiding the accurate engagement of threads.

Figure 3:
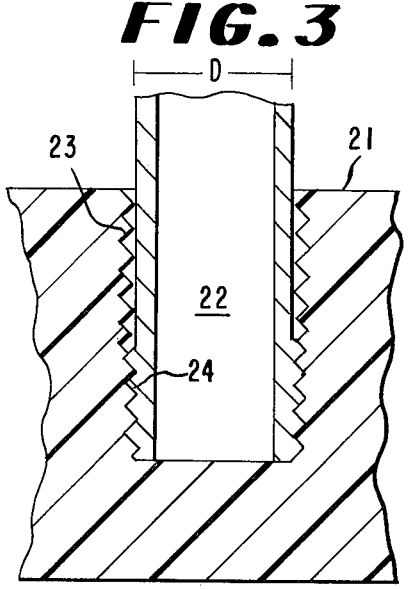

The required distance of the first engaged thread from the sheet surface can also be provided by modification of the male threaded element as shown in FIG. 3. In that figure, sheet 21 has a passageway 22 extending partly therethrough. The female threads 23, extending the full length of the passageway, are engaged with male threads 24. The remainder of the male threaded element is of a diminished diameter $D$ equal to or less than the innermost diameter of the female threads.

The engaged threads should be designed to hold against any expected force tending to pull them out. The required number of engaged threads depend on their radii, the strength of the sheet structure materials involved, and the force the threads must resist. Normally at least four full threads are engaged in the sheet structure, especially when the threads are tapered pipe threads.

The polymeric materials of the sheet structures can be any which are flow or creep resistant under the intended use conditions. Representative materials include phenolic, polyester, melamine and, preferably, epoxy resins. Fibrous reinforcements are known in the art and can be exemplified by cotton fabric and, preferably, glass fibers as continuous filaments, woven fabrics, and crossed layers of continuous filaments.

The sheet structures can comprise preformed fiber-reinforced resin structures such as are commercially available or they can be structures formed by impregnating preshaped layers of reinforcing fabrics or filaments with resin intermediates and curing to produce shaped sheet structures. The latter structures are normally preshaped in curved forms.

Sheet structures are easily prepared by conventional drilling, tapping and counter-boring procedures. When the male-threaded element is adjusted to provide the required thread distance from the surface, this can be done, for example, by lathing the element.

In cases where NPT taper pipe thread is used, the following penetration of the sheet structure can be expected from nominal pipe sizes:

| NPT Nominal Size (in.) | O.D. of Pipe (in.) | in. Engagement of 4 Threads | Full Engagement of Threads (in.) |
|---|---|---|---|
| ¼ | 0.54 | 0.22 | 0.40 |
| ⅜ | 0.68 | 0.22 | 0.41 |
| ½ | 0.84 | 0.29 | 0.53 |
| ¾ | 1.05 | 0.29 | 0.55 |

Typical diameters of cylindrical recesses used with these pipe sizes are

| Pipe Size | Recess Diameter |
|---|---|
| 3/8" | 23/32" |
| 1/2" | 7/8" |
| 3/4" | 1 1/8" |

Typical recess depths used with these pipe sizes are ⅛ inch in 4 ⅝ inch (dia.) circular end plates and 3/16 inch in 8 ½ inch end plates. The use of such recesses allows ¾ inch instead of 1 inch and 1 ⅛ inch instead of unrecessed 1 ½ inch thick 4 ⅝ inch plates of like material to be used and have higher delamination pressures. In 8 ½ inch end plates, recessed 1 ¼ inch thick material has at least the delaminating pressure of unrecessed 1 ½ inch thick 8 ½ inch plates of like material.

The structures of the present invention exhibit a markedly improved resistance to delamination when compared to similar structures having the same number of engaged threads but are not recessed from the outer surface. The structures are broadly applicable to pressurized vessels, and have found particular utility in reverse osmosis devices. There, they are beneficially used as end plates, often in conjunction with a feed pipe attached to the inner end of the passageway, opening onto surface 3 in FIG. 1.

The invention is further illustrated in the following examples.

EXAMPLES 1–4

In Examples 1–2, a cylindrical reverse osmosis permeator unit of 4 ⅝ inch inside diameter was assembled using an end plate having a 4 ⅝ inch diameter and a thickness of 1 ½ inches, being made of a glass fiber reinforced epoxy sheet material commercially identified as Laminate Grade G-10. The unit, exclusive of the end plate tested, was resistant to 4500 psig.

Two passageways were drilled through the end plate, one of the diameter corresponding to the smallest root diameter of ½ inch National Pipe Thread (NPT), the other of ⅜ NPT. Larger holes, ⅞ inch and 23/32 inch respectively in diameter, were coaxially drilled each ⅜ inch into each of the passageways. Threads, ½ inch and ⅜ inch NPT respectively, were cut into the passageways starting at the bases of the larger holes. Mating ½ and ⅜ inch pipes respectively were engaged in these threads for four threads each and then torqued until tight. The ½ inch threads penetrated 0.53 inch beyond the base of the larger hole, the ⅜ inch threads 0.41 inch beyond.

In Examples 3–4 the procedure of Examples 1–2 was followed except that the larger holes were drilled ¼ inch, instead of ⅜ inch, into the passageways before cutting pipe threads.

The procedure of Examples 1–2 was again repeated to provide Control Examples, except the larger holes were not drilled into the passageways before cutting pipe threads.

In each of the experiments, the same fittings were used. Each example was duplicated for check values of failure pressure.

All end plates were pressure-tested by pressurizing the permeator unit with water at a rate increasing about 600 psig per minute until 4500 psig was reached or until prior failure by end plate delamination. Failure by delamination, when it occurred, was sudden, perceptible by a "pop" and accompanied by great water leakage from the space between the end plate and its enclosing cylinder. The failure pressures are shown below:

| Example | Failure Pressure (psig) |
|---|---|
| 1 | >4500 (did not fail) |
| 2 | >4500 (did not fail) |
| 3 | 3650 |
| 4 | 3850 |
| Control A | 2100 |
| Control B | 2300 |

The water pressure with recessed pipe threads which produced delamination was increased over the end plates without recessed pipe threads. In addition, it can be seen that within the range of recess depths tested, increased depth of the recess produced greater resistance to end plate delamination.

I claim:

1. In the combination of (a) a sheet of organic polymeric material having a first and second side and reinforced therebetween with layered fibrous material aligned substantially parallel to the sides of the sheet, the sheet having a passageway formed therein, all the walls of the passageway being integral with and of the same composition as the remainder of the sheet material and formed directly in the sheet and having female threads formed therein extending less than the thickness of the sheet, and (b) a male-threaded element secured in the passageway from the first side of the sheet by engagement of the male threads with the female threads in the passageway, the improvement wherein the engaged male and female threads nearest to the first side are a distance from the first side which is at least equal to 10 percent of the depth of engaged threads and not less than 2 millimeters.

2. An apparatus of claim 1 wherein the passageway extends through the entire thickness of the sheet.

3. An apparatus of claim 1 further comprising a recess formed in the passageway from the first side of the sheet to the first engaged male and female threads.

4. An apparatus of claim 1 wherein the male threaded element has a diameter less than the minimum male thread diameter for at least that portion of the male threaded element extending from the first side of the sheet to the engaged male and female threads nearest to the first side of the sheet.

* * * * *